United States Patent [19]

Heidebroek et al.

[11] Patent Number: 5,184,225
[45] Date of Patent: Feb. 2, 1993

[54] TELEVISION RECEIVER WITH SPOT BURN PROTECTION AND AFTER-GLOW SUPPRESSION

[75] Inventors: Wolfgang Heidebroek; Zeith W. C. Hsing, both of Singapore, Singapore

[73] Assignee: Thomson Consumer Electronics, S.A., Courbevoie, France

[21] Appl. No.: 725,052

[22] Filed: Jul. 3, 1991

[51] Int. Cl.$^5$ .......................... H04N 3/20; H04N 3/24
[52] U.S. Cl. ..................................... 358/243; 315/381; 358/220
[58] Field of Search ................ 315/380, 381; 358/220, 358/243, 74, 165, 188, 190

[56] References Cited

U.S. PATENT DOCUMENTS

| | | | |
|---|---|---|---|
| 3,407,330 | 10/1968 | Wilmarth | 315/381 |
| 3,462,640 | 8/1969 | Eltgroth | 315/380 |
| 3,535,445 | 10/1970 | Griffey | 315/381 X |
| 4,488,181 | 12/1984 | Haferl | 358/220 |
| 4,723,167 | 2/1988 | Griffey | 358/190 |

FOREIGN PATENT DOCUMENTS 62-92584  4/1987  Japan.
2-23777   1/1990  Japan.

Primary Examiner—Victor R. Kostak
Assistant Examiner—Mark R. Powell
Attorney, Agent, or Firm—Joseph S. Tripoli; Peter M. Emanuel; Richard G. Coalter

[57] ABSTRACT

A television receiver includes a high voltage kinescope driver amplifier having an input for receiving a video signal and a further input for receiving a character input signal from a low voltage character amplifier. When switching from a "run" mode to a "stand-by" mode, a control circuit generates a turn-off command signal for disabling the kinescope high voltage supply and concurrently initiating turn-off of the receiver deflection circuit at a controlled rate during a transition interval between the "run" and "standby" operating modes. The turn-off command is further applied during the transition interval to an input of the character amplifier so as to over-ride any character signal which may be present to drive the output of the character amplifier to a maximum brightness level which, in turn, over-rides any video signal applied to the high voltage amplifier. Accordingly, the kinescope is driven to a maximum brightness level during the transition interval regardless of the values of either the video signal or the character signal thereby fully discharging the kinescope, avoiding potential spot burn and preventing after-glow.

2 Claims, 5 Drawing Sheets

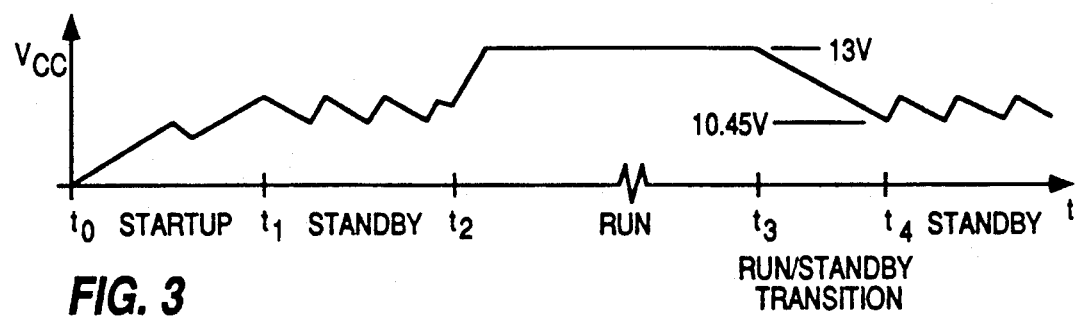
FIG. 3
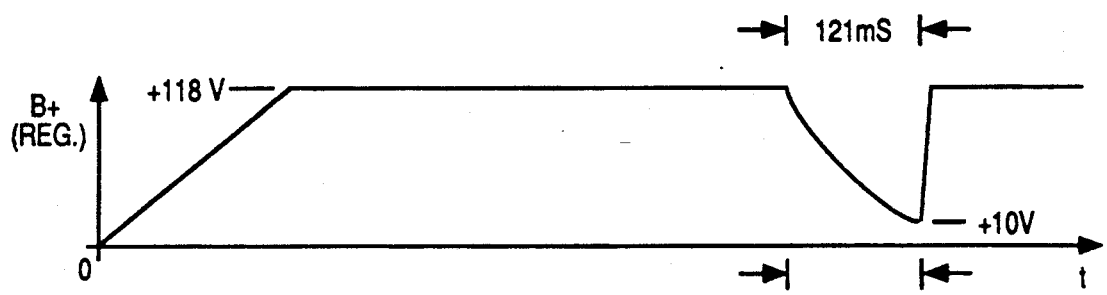
FIG. 4
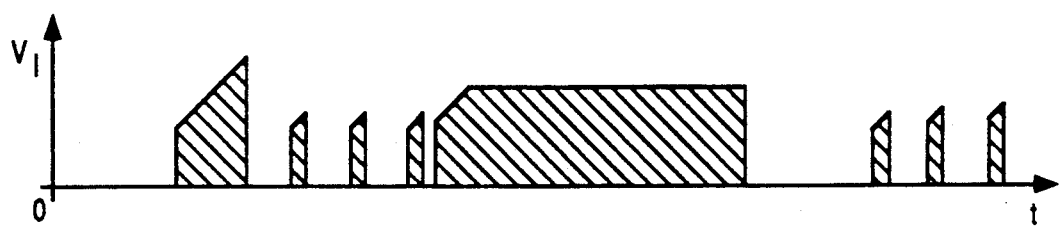
FIG. 5
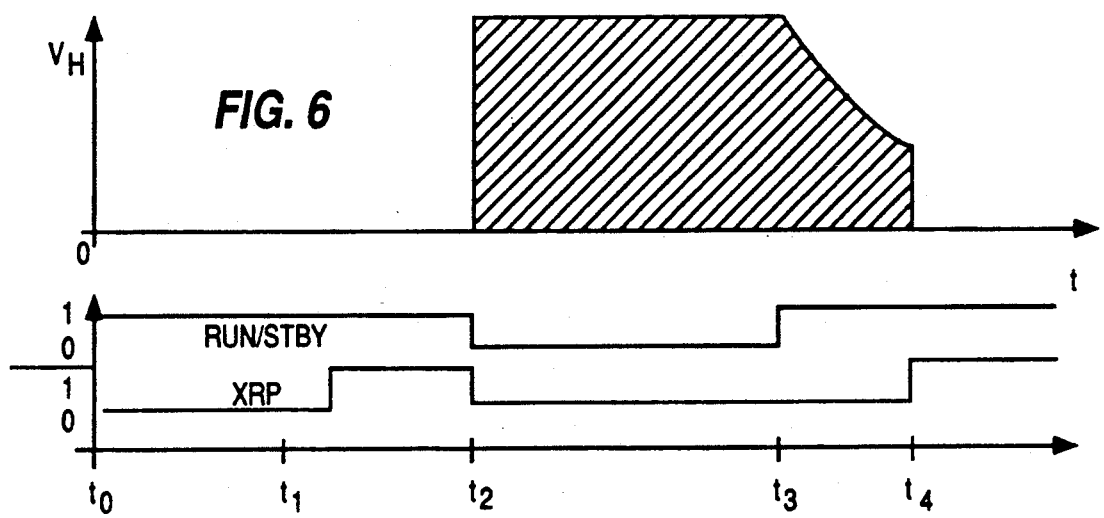
FIG. 6
FIG. 7

TELEVISION RECEIVER WITH SPOT BURN PROTECTION AND AFTER-GLOW SUPPRESSION

FIELD OF THE INVENTION

This invention relates to television receivers and particularly to receivers in which provisions are made for preventing the appearance of certain visual artifacts (e.g., spot burn or after-glow) from appearing during a transition from the normal "run" mode of operation to a "stand-by" or "off" mode of operation.

BACKGROUND OF THE INVENTION

During the normal operation of a television receiver, the energy of the electron beam is distributed across a relatively large area of the picture tube screen. When the receiver is turned off or switched to a stand-by operating mode, the scanning currents in the horizontal and vertical deflection windings may collapse before the energizing potential for various electrodes of the picture tube decay sufficiently to prevent the generation and acceleration of the electron beam, and the concentration of beam energy may damage the kinescope phosphor or produce undesired visual artifacts such as after-glow.

An example of a television receiver having run and stand-by operating modes and which includes provisions for kinescope spot burn protection during a transition from the run or normal viewing mode to a stand-by mode (in which some receiver circuits remain energized) is described by Peter E. Haferl in U.S. Pat. No. 4,488,181 entitled ELECTRON BEAM SUPPRESSION CIRCUIT FOR A TELEVISION RECEIVER which issued Dec. 11, 1984.

In an exemplary embodiment of the Haferl receiver, a deflection generator is coupled to the deflection winding for generating scanning current to produce a sweep of the electron beam across the phosphor screen of a kinescope. A remote control circuit develops an on/off command signal for switching the television receiver between normal run and stand-by operating modes. A first switch is responsive to the command signal and disables normal generation of the scanning current upon the occurrence of the off-state of the command signal in inhibit normal sweep of the electron beam. A second switch, also responsive to the command signal, applies to the grid electrode of the picture tube, a blocking potential upon the occurrence of the off-state of the command signal to suppress generation of the electron beam prior to the disablement of scanning current generation.

The Haferl technique of applying grid cut-off bias to the kinescope when switching the receiver from on to off is an excellent and effective method of preventing kinescope spot burn. It is a further feature of the Haferl receiver that provisions are also made for suppression of an after-glow effect under a so-called "hot start" receiver operating condition. Specifically, Haferl includes provisions for delayed build-up of screen grid voltage. This delay ensures that no beam spot becomes visible even should the television receiver be turned on while the cathode electrodes are still hot and while a substantial ultor voltage still remains. Such a situation may occur when the receiver is rapidly cycled between standby and normal running modes of operation (i.e., a "hot start" condition).

SUMMARY OF THE INVENTION

It is herein recognized that a need exists for a receiver with provisions for suppressing spot burns and after-glow effects when switching between run and stand-by modes and which additionally provides a safety feature by ensuring that no dangerous high voltages are present at the kinescope ultor circuitry during the standby mode. The present invention is directed to meeting these needs.

A television receiver embodying the invention a kinescope, a high voltage supply for the kinescope, a kinescope driver amplifier, a deflection circuit and a control circuit. A first means, responsive to a turn-off command signal from the control circuit, disables the high voltage supply and initiates turn off of the deflection circuit at a controlled rate. A second means responsive to the turn off command signal applies a turn on drive signal to at least one electron gun of the kinescope for discharging high voltage therefrom.

Advantageously, the high voltage is drained from the kinescope as the displayed raster slowly collapses thereby providing the benefits of (1) the safety feature of having a fully discharged kinescope, (2) avoidance of kinescope spot burn and (3) the prevention of kinescope after-glow.

BRIEF DESCRIPTION OF THE DRAWING

The foregoing features of the invention are illustrated in the accompanying drawing wherein like elements are denoted by like reference designators and in which:

FIG. 3 is a timing diagram showing the VCC power supply level to a switched mode power supply controller in the receiver during start-up, standby, run, and run/standby transition;

FIG. 4 is a timing diagram corresponding to FIG. 3 and showing the B+ voltage level on the primary winding of a fly-back transformer in the receiver;

FIG. 5 is a timing diagram showing the pulse envelopes of the current in the primary winding of the power transformer, at point VI;

FIG. 6 is a timing diagram showing the pulse envelope of horizontal scanning signal VH during the run mode and the run/standby transition;

FIG. 7 is a timing diagram showing the logic signals STBY (or NOT-RUN) and XRP.

DETAILED DESCRIPTION

Figure 1:
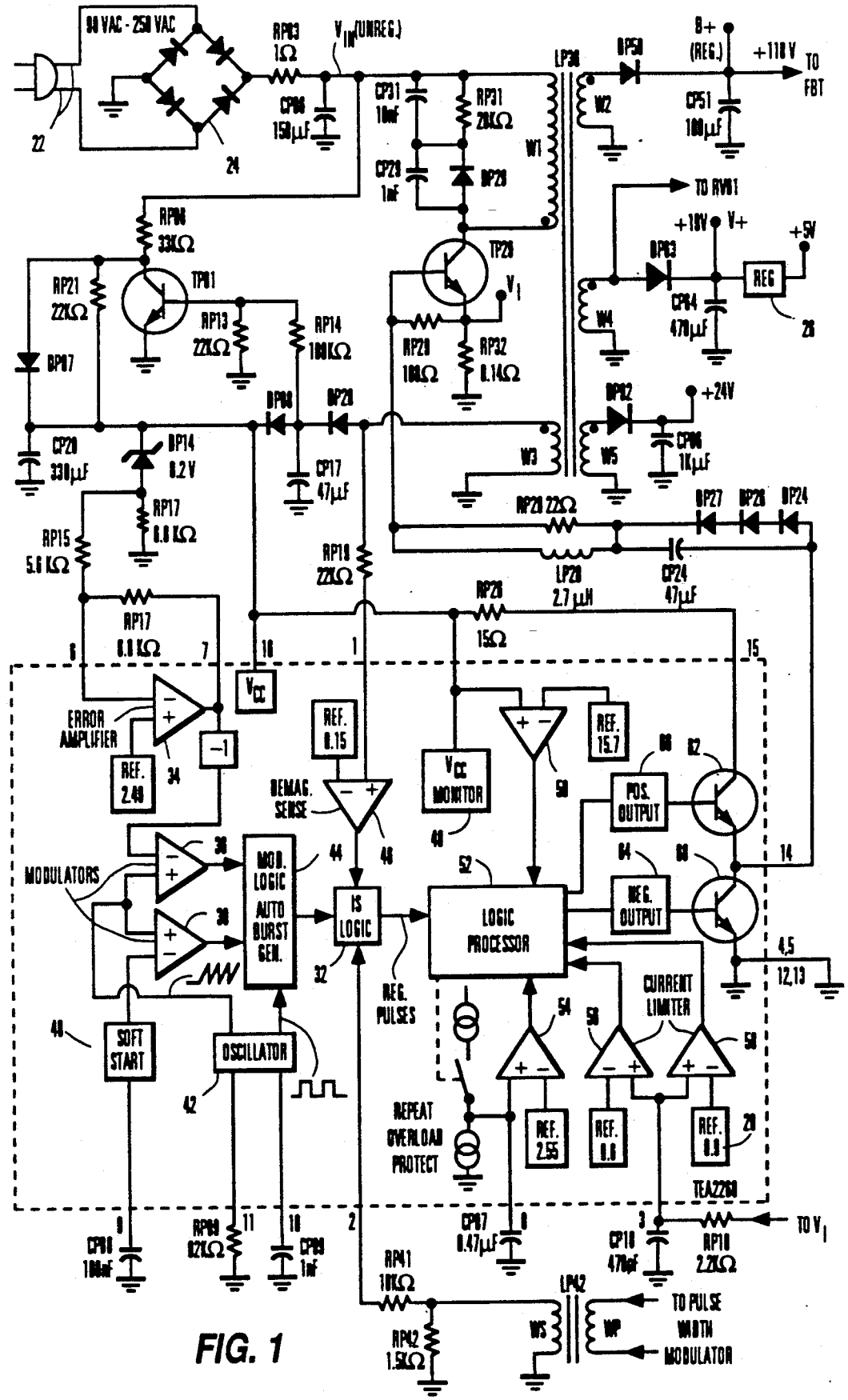
FIGS. 1 and 2, together, comprises a schematic diagram, partially in block diagram form, of a television receiver embodying the invention.
Figure 2:
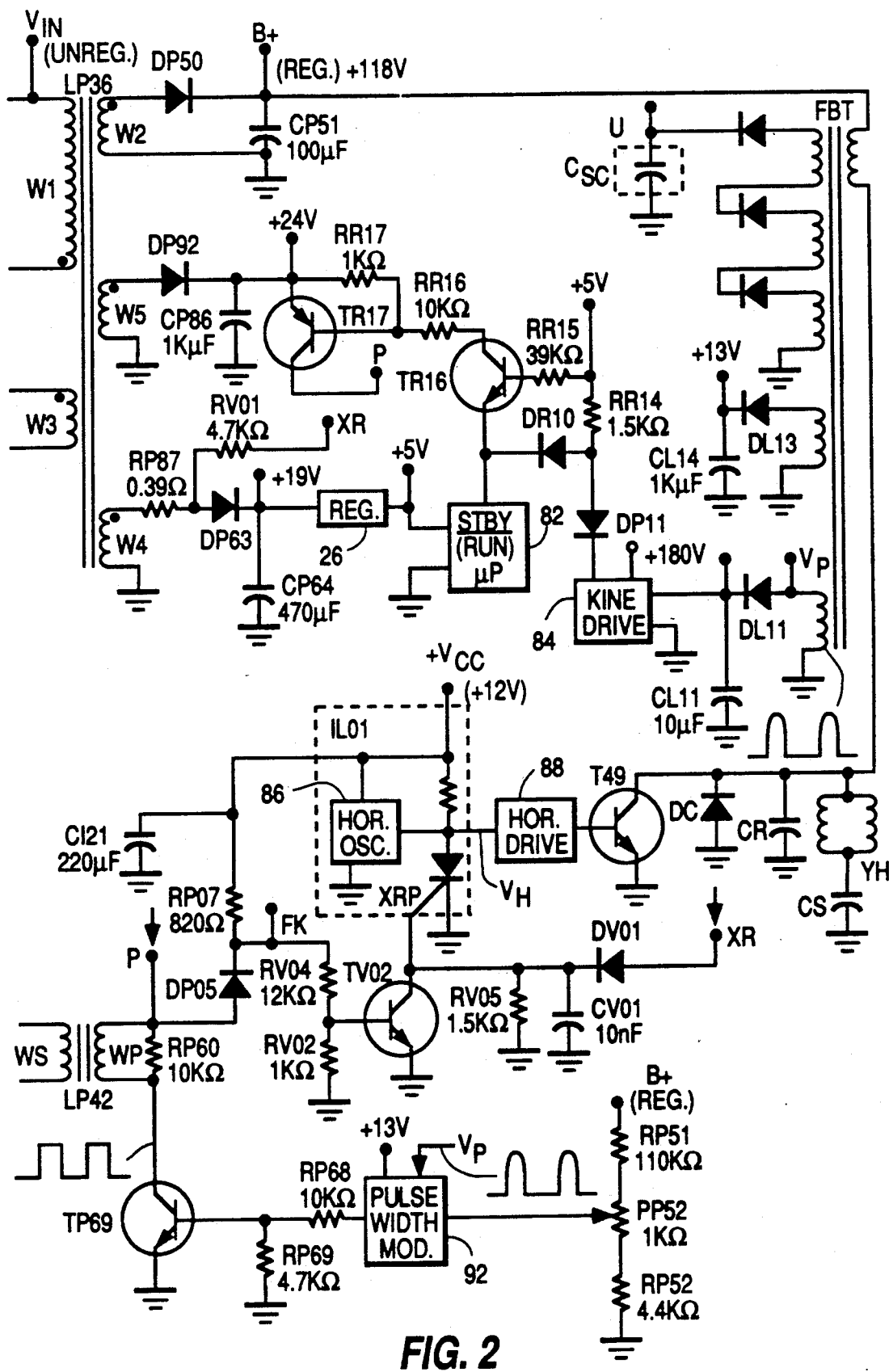
Figure 8A:
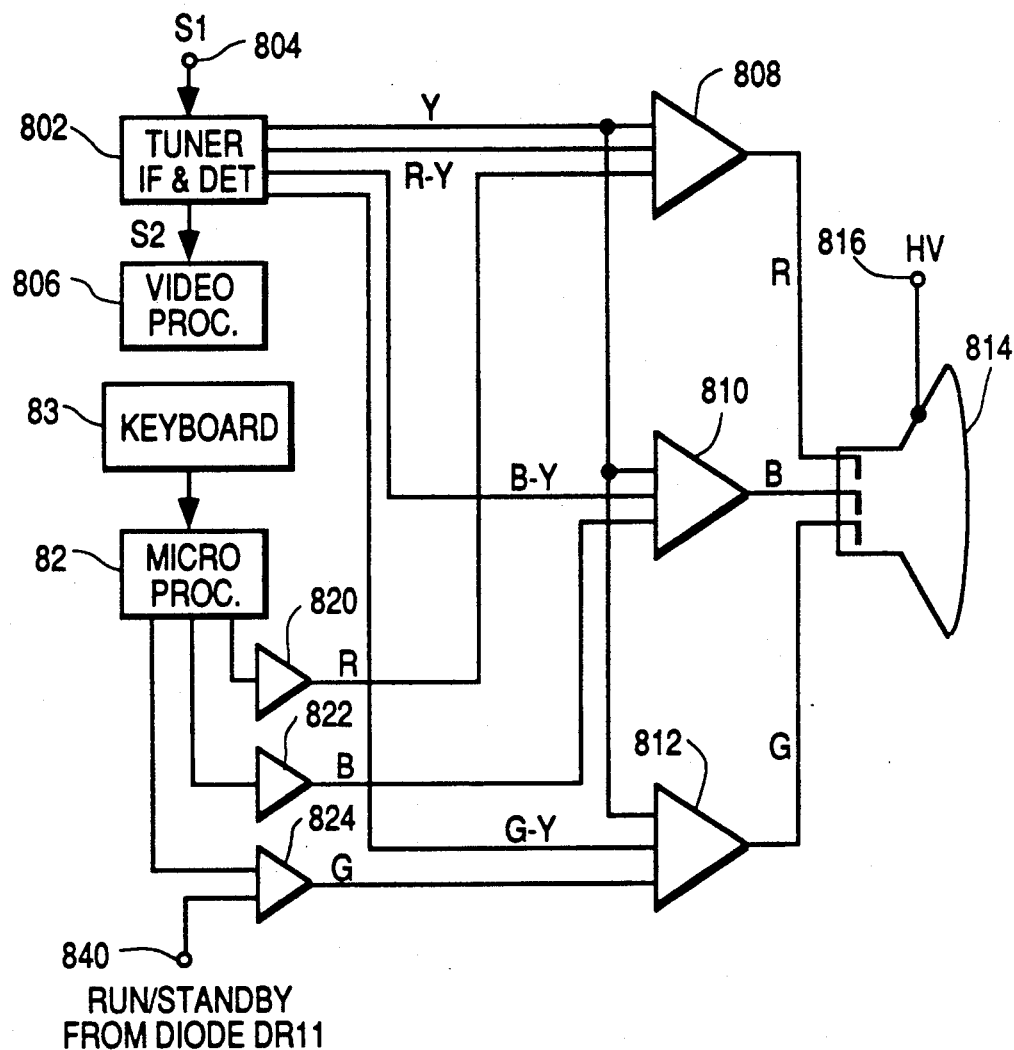
FIGS. 8A and 8B are block and circuit diagrams illustrating details of kinescope drive circuitry in the receiver of FIGS. 1 and 2.
Figure 8B:
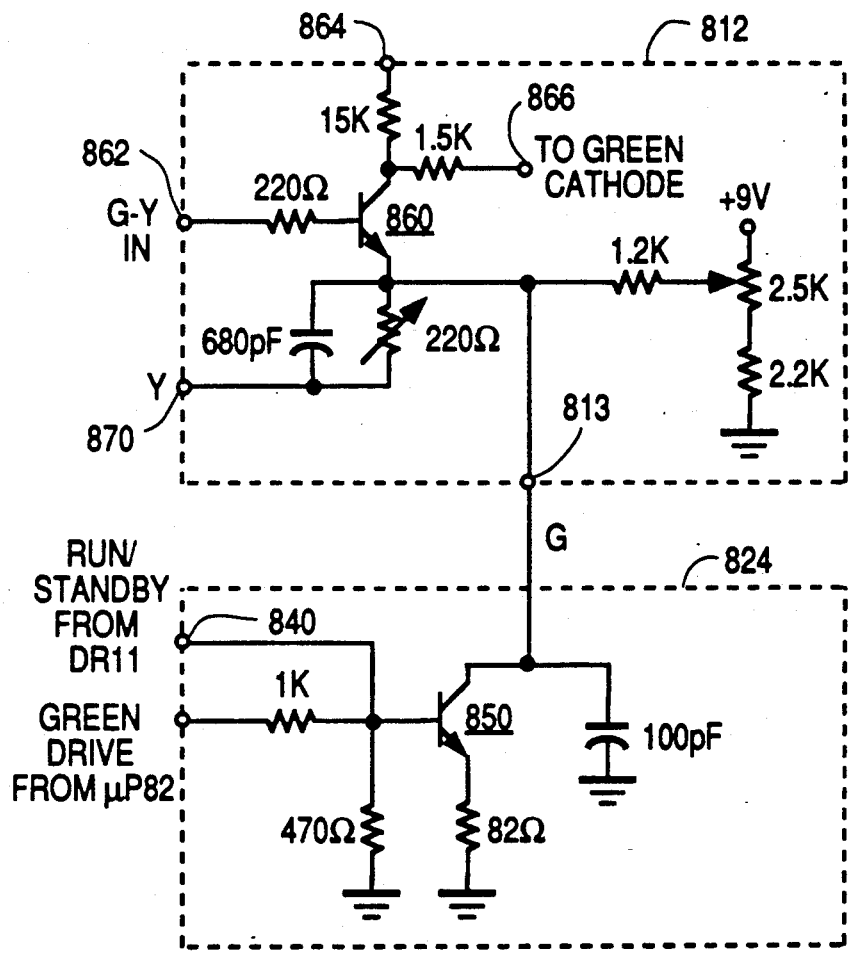

To simplify the drawing, FIG. 1 shows portions of the receiver related to the primary side of a power supply transformer LP36 and FIG. 2 illustrates portions of the receiver related to the secondary side of the transformer. Also, FIGS. 8A and 8B illustrate details of the video processing of the receiver of FIGS. 1 and 2.

In FIG. 1, power to the television receiver from AC mains 22, which can be between 90 and 250 VAC for operation at North American or European levels, is full wave rectified by bridge 24 and filtered by current limiting resistor RP03 and capacitor CP06, to provide the unregulated input voltage VIN, coupled to the primary winding W1 of power transformer LP36. The other terminal of winding W1 is coupled to the collector of power transistor TP29, which is driven by the output of switched mode power supply controller 20, such as SGS-Thomson Microelectronics model TEA2260, the respective pin numbers of connections to the controller being shown in the drawing.

Controller 20 has two operational modes. In the slave mode controller 20 is responsive to width modulated pulses fed back from a secondary winding of the flyback transformer FBT, shown in FIG. 2, the width of the pulses controlling coupling of energy from unregulated input voltage VIN to the B+ regulated output of transformer LP36. The B+ output is coupled to the primary winding of flyback transformer FBT, for driving horizontal scanning and for coupling power to various loads which are operative only in the run mode of operation of the television receiver. In a second mode of operation of controller 20, i.e., when no width modulated pulses are applied for regulation from the secondary side of the power supply, controller 20 reverts to regulation based upon an error input derived from secondary winding W3 of power transformer LP36. Regulation via the error input is active only in the absence of pulses from the secondary side feedback. Whenever pulses are present, the error input is ignored. The regulated output level of the controller is arranged to be higher in the slave mode of operation than in the second, error input mode.

The television receiver initiates operation in the standby mode, and can be switched into the run mode under control of microprocessor 82, shown in FIG. 2. The microprocessor 82 as well as the power supply controller 20, shown in FIG. 1, are powered during the standby mode as well as the run mode.

When first coupled to the AC mains 22, power to the VCC pin of controller 20 is provided by a startup current supply coupled to the unregulated VIN voltage from bridge rectifier 24. Capacitor CP28, which is coupled to VCC pin 16 of controller 20, is charged through current limiting resistor RP06 and forward-biased diode DP07. Once controller 20 is operational, its output pulses couple power from primary winding W1 of transformer LP36 via power transistor TP29 through to secondary winding W3. The signal on secondary W3 is rectified by diode DP28, filtered by capacitor CP17, and coupled to the VCC input of controller 20 through forward biased diode DP08. The controller thus powers itself after starting initially from the charge applied to capacitor CP28.

During the startup sequence, as shown in FIGS. 3 and 5, the voltage at VCC ramps up with charging of capacitor CP28 until controller 20 becomes operational and begins outputting pulses. Controller 20 has a number of internal limiting circuits to prevent overvoltage or overcurrent conditions which could occur initially, and can turn itself off and/or limit its output to safe levels as the power supply comes up to power. In addition to soft start circuit 40, which is coupled to capacitor CP08 to define the rate at which the amplitude of successive pulses can increase, minimum and maximum VCC voltage limits are defined by VCC monitoring circuits 48, 50. Repeat overload is sensed by comparator 54, coupled to external capacitor CP07 and to internal voltage and current references. Maximum output current in power transformer LP36 is limited by current limiting comparators 56, 58, coupled via resistor RP18 to a current sensing resistor RP32 in series with the emitter of power transistor TP29. The signal at the current sense input is filtered by capacitor CP18. Demagnetization comparator 46 is coupled directly to winding W3 for sensing zero crossings. These protective circuits typically delay the initiation of pulses until VCC charges to a minimum and after one or more limit-imposed lapses of pulses bring VCC up to a reference level defined by the input to error amplifier 34 of controller 20.

The reference level at the inverting input or error amplifier 34 is provided by zener diode DP14, which is coupled at its anode to ground through resistor RP16 and to the error amplifier input through resistor RP15. Zener DP14 breaks down when the voltage on winding W3 through the diode drops of DP28 and DP08 reaches 8.2 volts, and accordingly applies about 2.25 volts to the error input, for comparison with the internal reference of 2.49 volts coupled to the noninverting input of error amplifier 34. Resistor RP17 is coupled between the output of the error amplifier 34 and the inverting input, to set the gain of the error amplifier.

When the output of the controller has driven VCC to a high enough level that the error amplifier output indicates that a high threshold has been reached, controller 20 enters the burst mode and internally revises its operation to track on 90% of the reference level rather than 100%. Emission of pulses ceases and the VCC voltage accumulated in storage capacitors CP28, CP17, etc. drains away over a time until the voltage meets the 90% threshold. Controller 20 resumes the original threshold and outputs a train of pulses which bring the output back to the 100% reference level, and so forth. The regulated output voltage at VCC defines a series of rising and falling ramp voltages with a hysteresis between the two thresholds, as shown in FIG. 3 between times t1 and t2.

The output of the error amplifier 34 is coupled to modulators 36, 38, which are also coupled to the soft start ramp of soft start circuit 40 and to the ramp output of oscillator 42. The modulator outputs are coupled to modulation logic and automatic burst generator 44, the latter coupled to a pulse output of oscillator 42. The ramp slope and pulse width are set via external resistor RP09 and capacitor CP09. IS logic stage 32 preferentially couples the input from resistor RP41 and the secondary side pulse width modulator through to the output of controller 20. However when no pulses are received through resistor RP41 the output of modulator logic element 44 is coupled through to the output of the controller. Regulation pulses from IS logic block 32 are coupled to logic processor 52, and through positive and negative output drivers 62, 64 to output transistors 66, 68, which supply current or drain current from the output at pin 14 of controller 20.

Transistor TP01 is coupled between current limiting resistor RP06 and ground in the startup current circuit. After capacitor CP28 has charged up through resistor RP06 and diode DP07 from the AC mains and controller 20 begins to regulate VCC through feedback from secondary winding W3 of power transformer LP36, the voltage at the base of transistor TP01 and at series resistor RP14 and biasing resistor RP13 rises with charging of capacitor CP17, and turns on transistor TP01. The charging current from resistor RP06 is thus discharged to ground, and the current through resistor RP21, which acts as a dumb load in parallel with storage capacitor CP28, is also discharged to ground. By using the dumb load of resistor RP21 across voltage VCC, variations in current loading between different TEA2260 controllers can be minimized, providing a circuit design which has a relatively constant delay time over a range of controller current load ratings and at different AC mains levels.

The output of controller 20 is coupled to the base of power transistor TP29 through a network including capacitor CP24 in parallel with series diodes DP24, DP26 and DP27. In the positive phase of the pulsed output of controller 20, diodes DP24, DP26 and DP27 are forward biased and thus define a diode drop voltage of about 2.1 volts for charging capacitor CP24. In the negative phase of the output of controller 20, the accumulated charge in capacitor CP24 helps to sweep out the base/emitter charge in power transistor TP29, for stopping conduction of TP29 sharply. Resistor RP28 and inductor LP28 provide pulse shaping to the base of transistor TP29, and resistor RP29 provides biasing. On the collector of transistor TP29 a damping network and clamping arrangement is defined by diode DP29 and resistor RP31, with capacitors CP29 and CP31 being coupled in parallel with diode DP29 and resistor RP31, respectively.

In addition to secondary winding W3 on power transformer LP36 for providing VCC to controller 20, secondary windings W2, W4 and W5 provide other regulated output voltages. The signal on secondary winding W2 is rectified by diode DP50 and filtered by capacitor CP51, providing the regulated B+ output at +118 V for driving the flyback transformer FBT. A +19 V supply is provided by winding W4, as rectified by diode DP63 and filtered by capacitor CP64. Winding W5 provides +24 V via diode DP92 and capacitor CP86 in a similar manner.

The output voltages at all the secondary windings of power transformer LP36 are regulated together with regulation of VCC by controller 20 via the feedback path from error amplifier 34 from winding W3. However, the loading on the secondaries may vary. For example, in the absence of horizontal pulses to the flyback transformer, the B+ voltage is not loaded and remains constant while VCC varies due to burst mode operation of controller 20. The +19 V supply is further regulated to +5 V by regulator 26, for providing a stable supply voltage to microprocessor 82 notwithstanding the rise and fall of VCC in the burst mode of controller 20.

Referring to FIG. 2, which continues from FIG. 1 on the secondary side of power transformer LP36 and includes the above-identified windings of the power transformer using the same reference numbers, the regulated B+ voltage from winding W2 is coupled to the primary winding of flyback transformer FBT. Whereas the controller 20 operates in both the run mode and the standby mode, the B+ voltage is always generated. Current through the primary winding of transformer FBT is controlled by horizontal output transistor TL19, which obtains pulses from the horizontal oscillator 86 and horizontal output driver 88 only in the run mode. Clamping diode DC, retrace capacitor CR, horizontal deflection windings YH and S-shaping capacitor CS are coupled to the collector of horizontal output transistor TL19, and to the primary winding of transformer FBT, for controlling horizontal deflection.

The secondary windings of transformer FBT are coupled to the run mode loads, being energized only during horizontal scanning. The run mode loads include the screen anode (shown generally as CSC), coupled to the ultor supply voltage U; the kinescope drives 84, coupled to a +180 V supply via diode DL11 and filter capacitor CL11; and additional loads including the pulse width modulator 92, coupled to a +13 V supply via diode DL13 and filter capacitor CL14.

The secondary winding for the kinescope drivers provides flyback pulses at signal VP, which are fed back to controller 20 for synchronizing operation of the switched mode power supply with horizontal scanning. In this manner, the current in primary winding W1 of the power transformer LP36 can be shut off during the retrace blanking period, such that the energy emitted from transformer LP36 when shutting off power transistor TP29 will not effect the display. Signal VP is coupled to pulse width modulator 92, which is also coupled to the B+ regulated voltage via a voltage divider formed by resistors RP51, RP52 and potentiometer PP52. The pulse width modulator outputs pulses via resistor RP68 and biasing resistor RP69 to the base of transistor TP69, the width of the pulses varying with the level of the input from the wiper of potentiometer PP52.

The signal applied to transistor TP69 by the pulse width modulator represents secondary side feedback of the level of the B+ regulated voltage to controller 20. The collector of transistor TP69 is coupled to the primary winding WP of signal coupling transformer LP42, and the emitter is grounded. Provided there is a supply voltage at point P, coupled to the opposite terminal of winding WP, transistor TP69 conducts to apply the width modulated pulses to a primary winding WP of signal coupling transformer LP42. Resistor RP60, in parallel with winding WP, provides bias. Referring back to FIG. 1, the feedback pulses are coupled to the slave input of controller 20 through resistors RP41 and RP42, and provide feedback for regulating the B+ voltage in the run mode. Transformer LP42 as well as power transformer LP36 isolate the "hot" ground on the primary side of power transformer LP36 (and/or the WS winding side of transformer LP42) from the "cold" or chassis ground on the secondary side of transformer LP36 (the primary side of LP42).

In FIG. 2, the signal P is derived from the STBY output of microprocessor 82, and is high in the run mode and low in the standby mode. Signal STBY is coupled to the emitter of transistor TR16, and the base of transistor TR16 is coupled to the +5 V supply through resistor RR15. The +5 V supply, which is regulated from the +19 V supply at winding W4, is active in the standby mode and in the run mode and also powers microprocessor 82. When entering the run mode, microprocessor 82 pulls the STBY signal low, allowing transistor TR16 to conduct. The collector of transistor TR16 is coupled to the base of PNP transistor TR17 through resistor RR16, and biased by resistor RR17 relative to the emitter of transistor TR17, coupled to the +24 V power supply from winding W5 of the power supply transformer LP36. When STBY is low, signal P is +24 V and when STBY is high (i.e., in the standby mode), signal P is at ground.

Signal P provides power to winding W5 of signal transformer winding WP and to the horizontal oscillator VCC input through diode DP05, which provides signal FK at its cathode. Signal FK is coupled to VCC of the horizontal oscillator 86 through resistor RP07, and the VCC input is filtered by storage capacitor CI21. Signal FK is voltage divided by resistors RV04 and RV02. The base of transistor TV02 is coupled to the junction of resistors RV04 and RV04, and the collector of transistor TV02 is coupled to the X-ray protection input XRP of integrated circuit IL01, which includes the horizontal oscillator 86. The XRP input blocks the output of the horizontal oscillator. The XRP input is high true, and is held low by transistor TV02 when signal P is high. There are a number of ways in which the XRP signal can block the output of the horizontal oscillator. In the embodiment this function is shown generally by an internal SCR coupled to the output of the horizontal oscillator 86, which is coupled to the horizontal oscillator VCC through an internal resistor.

When signal P is low, during standby, transistor TV02 does not conduct. When transistor TV02 is not grounding the XRP input the XRP input can be driven high by signal XR, derived from winding W4 of the power supply transformer LP36. Winding W4 is coupled through current limiting resistor RP87 and series resistor RV01 to diode DV01. The cathode of diode DV01 is coupled to the XRP input of integrated circuit IL01, which includes horizontal oscillator 86, for blocking the output of the horizontal oscillator 86. Integrated circuit IL01 can be Mitsubishi model M52043SP in a phase alternating line (PAL) television receiver. The signal at the cathode of diode DV01 is filtered by capacitor CV01 and coupled to ground through resistor RV05.

Referring to the timing diagrams of FIGS. 3 through 7, the transitions between the run mode and the standby mode are arranged to define a transition mode between the run mode and the standby mode, and to positively end the transition mode using the output of controller 20 to block horizontal pulses. The two modes of operation of the switched mode power supply controller 20 form a means to delay disabling of the horizontal oscillator 86 such that the picture collapses and the screen anode voltage U is discharged when switching into the standby mode from the run mode. The level of the B+ supply to the flyback transformer FBT collapses during the transition interval upon entering the standby mode. However during the transition interval horizontal scanning and electron beam current continue, at falling amplitude due to discharge of the +180 V and +24 V supplies, thus draining the ultor voltage U on the screen anode.

The signals developed in the switched mode power supply are used for ending the transition upon entering the standby mode. Whereas a different voltage reference for the switched mode power supply controller in the run mode and the standby mode (higher in the run mode), the controller ceases generating output pulses during an interval immediately after switching from run to standby. At the end of the transition interval the generation of pulses by the controller in the burst mode defines the end of the transition. The difference in the reference levels of the controller 20 (providing a higher output voltage in the run mode than in the standby mode) accurately times the transition interval, the reoccurrence of pulses at the end of the transition accurately defining the end of the transition interval.

In FIGS. 3-7, following the start-up interval from t0 to t1, controller 20 maintains VCC at a level between the upper and lower thresholds defined in the burst mode, thereby providing a series of rising and falling ramps between the two thresholds as shown in FIG. 3. During standby (from time t1 to t2), controller 20 provides occasional bursts of pulses to power transformer LP36, as shown in FIG. 5, to maintain VCC between the two error input thresholds of controller 20. Whereas the B+ supply voltage is unloaded, it remains at +118 V (FIG. 4).

When microprocessor 82 switches into the run mode at t2, for example due to a signal on an infrared remote control receiver (not shown), STBY is pulled down and the P signal is brought to +24 V by transistors TR16 and TR17. The P signal then supplies power to the VCC input of the horizontal oscillator 86, and couples width modulated pulses from pulse width modulator 92 to controller 20 through signal transformer LP42, synchronized with the fly-back pulses from signal VP on transformer FBT. Feedback to controller 20 thereby shifts from the internal reference coupled to error amplifier 34 to the pulse width modulator output signal coupled to IS logic block 32 through transformer LP42.

The feedback of width modulated pulses by modulator 92 is based on the B+ voltage via the voltage divider of resistors RP51, RP52 and potentiometer PP52, and is arranged to maintain the B+ voltage at +118 V. This results in a different and higher level of VCC at controller 20, for example +13 V. Whereas the output of controller 20 affects all the secondary windings W2-W5 of power transformer LP36, regulation via feedback from the B+ voltage also regulates the other secondaries, including the VCC level at controller 20. Therefore, in the run mode VCC is closely regulated to +13 V. Power is supplied via controller 20 and power transformer LP36 to the B+, +19 V, +24 V and +5 V supplies, and via transformer FBT to the deflection winding YH, the screen anode (ultor voltage U), the kinescope drivers 84 (+180 V) and the pulse width modulator 92 (+13 V). Due to the substantial loading in the run mode, controller 20 operates in the normal rather than the burst mode, and outputs width modulated pulses during each horizontal scan (FIG. 5), synchronously with the fly-back pulses on signal VP (FIG. 6).

At time t3, microprocessor 82 shifts into standby mode and allows signal STBY to go high. The circuit begins a transition from run to standby, lasting from times t3 to t4. At time t3, signal P immediately goes low in response to the STBY signal (FIG. 7), thus blocking feedback of pulses through signal transformer LP42 to controller 20 due to lack of a biasing voltage for transistor TP69. However, the horizontal oscillator 86 continues to operate due to the voltage stored in capacitor CI21, and diode DP05 blocks discharge of capacitor CI21 through transistor TP69. The VCC voltage at horizontal oscillator 86 begins to decay with the discharge of capacitor CI21.

Whereas feedback to controller 20 is absent as of time t3, controller 20 begins to regulate based upon the input at error amplifier 34. However the error input regulates between the upper and lower thresholds discussed above, which are lower than the +13 V level maintained when regulating the B+ voltage via pulse width modulator 92. Controller 20 therefore enters the burst mode and ceases generating pulses until VCC as derived from winding W3 of power transformer LP36 falls to the lower threshold, 10.45 V (FIGS. 3 and 5).

In the transition from run to standby the horizontal deflection circuit continues to operate. Moreover, because diode DR10 no longer blocks the +5 V level from being coupled to kinescope drivers 84 through diode DR11, the kinescope drivers turn on and provide electron beam current. However, the B+ voltage, which is loaded during the transition between t3 and t4 by the deflection circuits and kinescope driver, begins to fall as shown in FIG. 4. The horizontal output voltage VH to the deflection circuit also falls. The picture collapses with the drop in deflection current in horizontal deflection winding YH, and goes dark with the discharge of the screen anode voltage U and the drop in the +180 V supply to kinescope drivers 84.

The time delay of the transition upon entering the standby mode is defined by the difference between the run mode regulated level of VCC to controller 20 of about +13 V and the lower threshold of controller 20 in the burst mode of about +10.45 V, and also by the discharge of capacitor CP28 through dummy load resistor RP21, zener diode DP14, and the VCC input of controller 20. The high level of VCC in the run mode is set below the maximum voltage cutoff of controller 20, which in the TEA2260 is 15.7 V. According to the embodiment shown the transition lasts 121 mS.

When VCC at controller 20 reaches the low threshold, the transition period ends. Pulses are emitted at the output of controller 20 and coupled through transformer LP36 to secondary winding W2, thereby driving the B+ voltage from its discharged level of about +10 V back to its nominal +118 V. However, since the horizontal oscillator is still operating at the discharged level of capacitor CI21, the return of the B+ voltage would resume deflection and generation of power to the screen anode and kinescope drivers 84. The resumption of pulses on the output of controller 20 is used to positively switch off the output of horizontal oscillator 86, using the X-ray protection input to integrated circuit Il01, for blocking the output of the horizontal oscillator 86.

When controller 20 resumes pulses to winding W1 of power transformer LP36 at time t4, power is coupled to secondary winding W4 and through resistors RP87 and RV01 applied to signal XR. The signal is peak rectified by diode DV01 and filtered by capacitor CV01, driving high the XRP input to integrated circuit IL01. The horizontal pulses at VH are cut off precisely at time t4, immediately before the B+ voltage is driven back to +118 V by controller 20.

Inasmuch as the ultor voltage is drained by continued operation of the kinescope drivers while the horizontal deflection signal collapses, the screen anode is discharged by electron beam current, reducing the potential for electrical shock to service personnel. The collapse of the picture and discharge of the ultor voltage are precisely timed by controller 20, positively blocking the horizontal oscillator output at the conclusion of the transition period.

FIG. 8A illustrates details of the kinescope drive circuit 84 of FIG. 2 in block diagram form. FIG. 8B is a detailed circuit diagram illustrating kinescope driver amplifiers and on-screen display (OSD, hereafter) driver amplifiers used in FIG. 8A.

In FIG. 8A a tuner, IF amplifier and detector unit 802 having an antenna input 804 is provided for converting an RF input signal S1 at input 804 to baseband form S2. The baseband video signal S2 is applied to a conventional video processing unit 806 which processes the signal and produces a luminance output signal Y and three color difference signals R-Y, B-Y and G-Y which are applied via respective kinescope driver amplifiers 808, 810 and 812 to respective cathodes of the kinescope 814. High voltage (ultor potential) for kinescope 814 is applied to the ultor terminal 816.

The micro-processor 82, previously discussed, controls the receiver operating modes and includes a key board 83 for entering receiver commands such as channel number, on/off, volume and related picture control functions. Additionally, micro-processor 82 provides the function of generating on screen display (OSD) characters in RGB form. The OSD signals are applied via respective amplifiers 820, 822 and 824 to respective inputs of the kinescope cathode driver amplifiers 808, 810 and 812. The OSD driver amplifier 824 for the Green drive signal also has a further input 840 connected to receive the run/stand-by signal provided by diode DR11 of FIG. 2.

In operation tuner 802 and processor 806 generate the picture representative signals Y, R-Y, B-Y and G-Y which are matrixed and amplified by driver amplifiers 808, 810 and 812 for application the the R, G and B "guns" (i.e., cathodes) of the picture tube 814. Micro processor 82 generates the RGB on screen display signals which are applied to the driver amplifiers via amplifiers 820, 822 and 824, respectively. When the user activates turn-off of the receiver by means of keyboard 83, the micro processor 82 generates power supply control signals previously described for placing the receiver in the stand-by mode and the stand by signal from diode DR11 is applied to the green OSD driver amplifier 824. This turns on the green cathode driver amplifier 812 thereby causing the green electron gun of the kinescope to produce a green raster. Enablement of the green gun of the kinescope discharges the ultor voltage while the raster slowly collapses. When the transition from run to off is complete, the kinescope is fully discharged of high voltage and no after glow can occur. Also, during the transition time there can be no spot burn because the collapsing raster is of a relatively large area and therefore not concentrated in a spot.

The schematic diagram of FIG. 3 shows details of how the run/standby signal provided by diode DR11 is applied to the green OSD driver amplifier and thence to the green cathode or "gun" driver amplifier. Specifically, amplifier 824 comprises an NPN transistor 850 having a base electrode coupled to input 840 for receiving the run standby signal from diode DR11. The base is also coupled via a resistor to input 842 for receiving the green OSD drive signal and is coupled to ground via a "pull down" resistor which turns transistor 850 off in the absence of base drive signals. The emitter of transistor 850 is coupled to ground via a relatively low valued emitter resistor and the collector is coupled to the green drive input 813 of amplifier 812. A small capacitor is also coupled from the collector of transistor 850 to ground to limit the rate of change of the green OSD signal so as to avoid exceeding the bandwidth of the kinescope and driver amplifier.

Driver amplifier 812 comprises an NPN transistor 860 having a base electrode coupled via a current limiting resistor to the G-Y input 862. The collector of transistor 860 is coupled via a load resistor to a supply terminal 864 for receiving a source of high voltage (e.g., 180 volts) and is also coupled by an electrostatic discharge protection resistor to an output 866 for connection to the green cathode of kinescope 814. The emitter circuit of transistor 860 includes a variable gain controlling resistor and a parallel peaking capacitor coupled to a luminance input terminal 870. Also, the emitter is coupled to terminal 813 for receiving the green OSD drive signal from amplifier 824 and is coupled to a DC level adjusting circuit comprising a potentiometer and a resistor coupled in series between a low voltage supply (e.g., 9 volts) and ground, the output tap of the potentiometer being coupled via a current limiting resistor to the emitter electrode.

In operation the transistor 860 combines or matirixes the G-Y and Y signals to generate a picture representative green output signal which is amplified and applied to the green gun of the kinescope. The proportions of G-Y and Y to derive the green output signal are controlled by the variable emitter resistor of transistor 860. The overall DC level (brightness) is controlled by the potentiometer of the low voltage supply in the emitter circuit. When OSD signals are being generated by micro processor 82, they are amplified by transistor 850 and applied to the emitter of the green drive transistor 860 thereby driving the cathode of kinescope 814 to its maximum green brightness level. White OSD characters are produced by driving all three guns with the OSD signals. Other colors may be produced by selectively driving the R,G and B guns with the OSD signals.

During turn off, the run/standby signal provided by diode DR11 turns transistor 850 on thereby producing a green raster. This overdrives any picture representative signal and so the green raster is of uniform brightness as the size of the raster slowly decreases as previously explained. Accordingly, the ultor voltage of the kinescope is discharged, spot burn is avoided and no afterglow can occur.

It is instructive to note that one can not rely upon the picture representative video to discharge the kinescope ultor voltage during the transition region from run to standby.

The reason that one can not rely on the picture representative video to dicharge the ultor voltage is that the picture representative signal is not predictable and it may be at black level at the moment that the user switches the receiver off.

Accordingly, it is essential to achieving the benefits of the invention that at least one gun of the kinescope be turned on during the transition region to discharge the kinescope. No reliance at all can be placed on the picture representative video signal for providing this function. One may, of course, turn on more than one gun of the kinescope during slow collapse of the raster but it has been found that one is all that is necessary to discharge the kinescope in the controlled manner hereinbefore described.

What is claimed is:

1. A television receiver comprising a kinescope, a driver amplifier for driving said kinescope, a high voltage supply, a deflection circuit, a control circuit for generating a turn-off command signal to cause said television receiver to change from a "run" operating mode to a "stand-by" operating mode during a transition interval; and circuit means responsive to said turn-off command for disabling said high voltage supply and for initiating turn-off of said deflection circuit at a controlled rate during said transition interval: characterized in that:

said driver amplifier comprises a high voltage amplifier and a low voltage amplifier;

said high voltage amplifier includes a signal input for receiving a picture representative video signal, a control input for receiving a control signal and an output coupled to an electron gun of said kinescope;

said high voltage amplifier responding to a given level of said control signal applied to said control input for over-riding any value of said picture representative video signal applied to said signal input such that said high voltage driver amplifier causes said electron gun to produce a maximum output electron beam level;

said low voltage amplifier having a first input for receiving an on-screen display character signal, having a second input coupled to receive said turn-off command signal and having an output coupled to said control input of said high voltage amplifier;

said low voltage amplifier being responsive to said turn-off command during said transition interval for over-riding any value of said character signal to cause said control signal to exhibit said given level, thereby over-riding said said picture representative signal in said high voltage amplifier during said transition interval so as to produce said maximum output electron beam level for discharging high voltage from said kinescope and for producing a display on said kinescope of uniform brightness across the display raster to as to prevent amplitude characteristics of either said picture representative signal or said on-screen display character signal from causing spot burn damage to said kinescope during said transition interval.

2. A television receiver as recited in claim 1 wherein said low voltage amplifier includes a transistor having a control electrode coupled via a resistor for receiving said on-screen display character signal and coupled via a diode for receiving said turn-off command signal.

* * * * *